United States Patent
Vigneau

(10) Patent No.: US 7,582,174 B2
(45) Date of Patent: Sep. 1, 2009

(54) METAL COMPONENT TREATED BY PUTTING SUBLAYERS IN COMPRESSION, AND METHOD OF OBTAINING SUCH A COMPONENT

(75) Inventor: Joel Olivier Alfred Abel Vigneau, Champcueil (FR)

(73) Assignee: SNECMA, Paris (FR)

( * ) Notice: Subject to any disclaimer, the term of this patent is extended or adjusted under 35 U.S.C. 154(b) by 304 days.

(21) Appl. No.: 11/463,170

(22) Filed: Aug. 8, 2006

(65) Prior Publication Data
US 2007/0107807 A1 May 17, 2007

(30) Foreign Application Priority Data
Aug. 12, 2005 (FR) .................................. 05 52508

(51) Int. Cl.
C21D 1/00 (2006.01)
C21D 7/06 (2006.01)
B24B 39/00 (2006.01)

(52) U.S. Cl. .............................. 148/565; 72/53; 29/90.7
(58) Field of Classification Search ................. 148/558, 148/320, 565; 29/90.7; 72/53
See application file for complete search history.

(56) References Cited

U.S. PATENT DOCUMENTS

| 5,531,570 | A | | 7/1996 | Mannava et al. |
| 5,846,057 | A | | 12/1998 | Ferrigno et al. |
| 6,514,039 | B1 | * | 2/2003 | Hand .......................... 415/119 |
| 6,559,415 | B1 | * | 5/2003 | Mannava et al. ....... 219/121.85 |
| 7,229,253 | B2 | * | 6/2007 | Broderick et al. ........... 416/225 |
| 2002/0124402 | A1 | * | 9/2002 | Berthelet et al. ........... 29/889.1 |

FOREIGN PATENT DOCUMENTS

| EP | 0 794 264 A1 | 9/1997 |
| EP | 1 208 942 A1 | 5/2002 |

OTHER PUBLICATIONS

C.S. Montross et al., "Laser Shock Processing and its effects on microstructure and properties of metal alloys: a review", International Journal of Fatigue, 24 (2002) 1021-1036.*

* cited by examiner

*Primary Examiner*—Roy King
*Assistant Examiner*—Jessee R. Roe
(74) *Attorney, Agent, or Firm*—Oblon, Spivak, McClelland, Maier & Neustadt, P.C.

(57) ABSTRACT

The invention relates to a metal component comprising at least a first zone treated by putting layers beneath the surface thereof in compression. It is characterized in that it comprises at least a first layer put in compression by shot peening and a deeper subjacent second layer put in compression by laser shock peening.

The component may be a turbomachine blade. According to the method, said zone is firstly treated by prestress shot peening followed by compression treatment by laser shock peening.

8 Claims, 1 Drawing Sheet

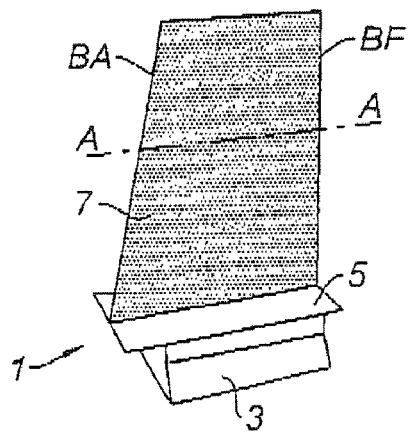
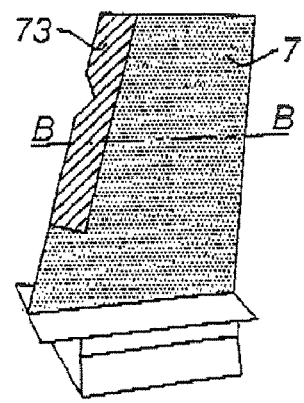
Fig. 1          Fig. 3
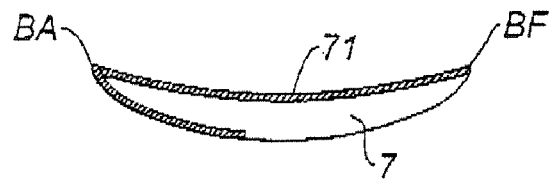
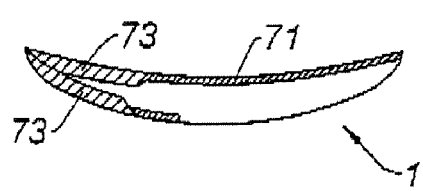
Fig. 2          Fig. 4
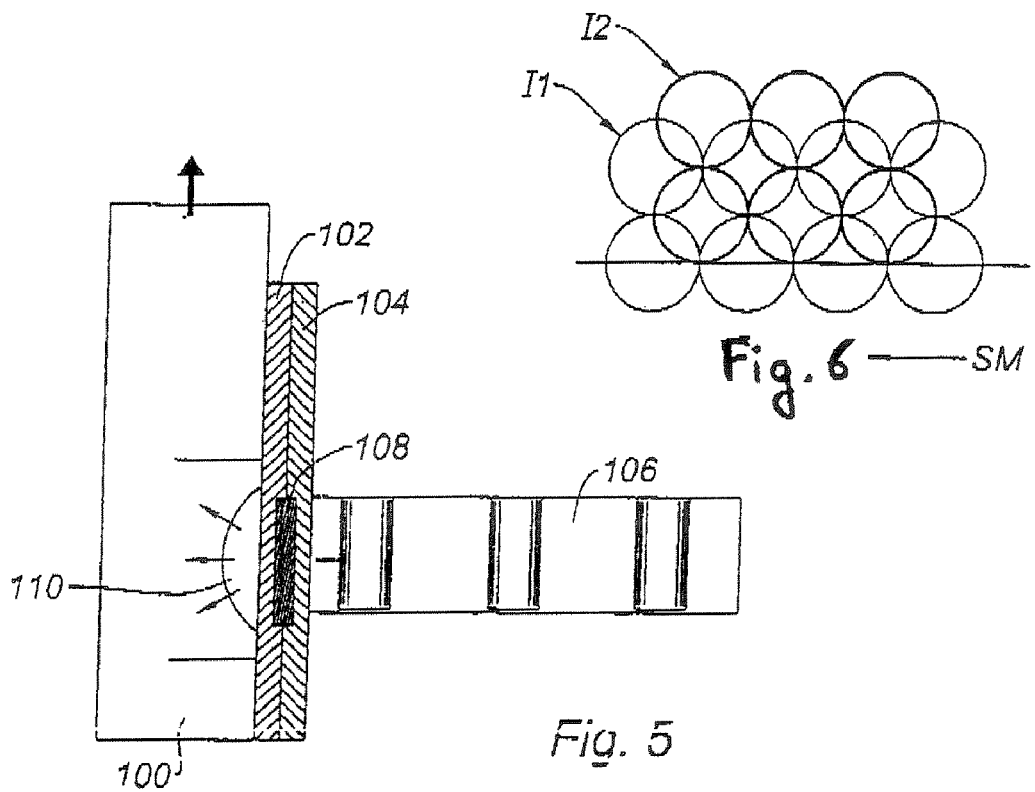
Fig. 6
Fig. 5

METAL COMPONENT TREATED BY PUTTING SUBLAYERS IN COMPRESSION, AND METHOD OF OBTAINING SUCH A COMPONENT

BACKGROUND OF THE INVENTION

The present invention relates to the field of the treatment of metal components by putting layers subjacent the surface of the components in compression. The invention relates in particular to the field of aeronautical turbomachines, where such a technique is used in order to improve the lifetime of the components subjected to high stresses, both mechanical and thermal. Thus, in particular the blades, rotor disks or blisks (one-piece bladed disks) are treated.

DESCRIPTION OF THE PRIOR ART

Several techniques for putting internal layers of metal components in compression are known. According to a first conventional technique, said layers are put in compression by spherical shot peening, the purpose of which is to create residual stresses on the surface and in the sublayers of the metal parts. The purpose of this compressive stress is to delay the appearance of cracks or to close up existing crack initiators. As a result, their mechanical behavior is improved. The shot used is made of a hard material, such as glass, ceramic or steel, and these are blasted at high velocity onto the surface of the components to be treated. The blasting is carried out in a turbine machine or by entrainment in a gas (air) stream, for example by means of a nozzle. The gas is subjected to an expansion and the shot is introduced into the stream created by the expansion.

Under the peening action of the shot, the surface, having exceeded the yield point is plastically deformed, creating a subjacent metal layer in compression. These compressive stresses thus improve the fatigue strength, the corrosion resistance and the friction coefficient. The impact of the shot creates compressive stresses in the metal down to a certain depth.

Using this technique, the depths in compression are up to 150 µm, with compressive stresses of around 400 to 500 MPa on the surface and 500 to 600 MPa at depths of around 50 µm.

Another prestressing shot peening technique uses ultrasound (hereafter called US shot peening) and this is described in patent applications EP 1 208 942 and EP 1 207 013 in the name of the Applicant, this technique consisting in making the shot move in the form of a spray of shot created, in a sealed chamber containing the component to be treated, by the active surface of a sonotrode excited by ultrasonic oscillation production means. In this technique, the depths under compression are down to 300-400 µm with residual compressive stresses of around 500 to 600 MPa on the surface and 700 to 900 MPa at depths of 50 to 100 µm. In general, ultrasonic shot peening generates compressive stresses that are substantially more intense and at larger depths than gas jet shot peening.

In the present application, the term "shot peening" is understood to mean shot peening by mechanical shock, the term covering peening using shot moved either by being blasted by a jet of gas or by ultrasonic vibration, or else roller burnishing.

In another technique, different than shot peening, the compression is induced by laser shock peening in which greater depths may be treated with higher levels of compression. The depths under compression are from around 0.5 to 1.5 mm, but may reach several millimeters, with residual compressive stresses of around 350 to 1000 MPa. In general, laser shock treatment generates residual compressive stresses at depths two to three times greater than for example US shot peening, for comparable stress levels. However, this laser shock peening process is relatively tedious to implement. Application of the laser requires the surfaces undergoing treatment to be covered with an ablative coating, either a paint or an adhesive tape, the ablation of which paint or tape by sputtering under the effect of the laser beam produces the shockwave that causes the treated material to be put in compression. This wave is confined by a material that covers the ablative coating and is transparent to the laser beam. In general, this is a curtain of flowing water. The laser must be capable of delivering a power density of the order of 10 GW/cm$^2$ with pulse durations of around ten to thirty nanoseconds (10 ns to 30 ns) and a firing frequency between less than one hertz and a few hertz.

The laser shock impact spots have a round, square, elliptical or possibly other shape, covering an area of the order of ten square millimeters (especially 10 to 20 mm$^2$). The impacts are repeated three or four times at each spot, in order for the entire range of depths to be treated and for the highest stress levels expected to be achieved gradually. However, at each impact of the laser, the coating is sputtered onto the surface of the laser spot (or even slightly beyond it), and it is therefore necessary to renew the ablative coating at each firing.

Furthermore, it is not possible to scan the entire surface to be treated with laser spots in a single sequence, even less so as the coating is destroyed by the laser impact beyond the area of the spot. Thus, according to the prior art, the treatment of a given surface requires a series of three or four scans. The treatment of a given surface is carried out by partial overlap of the impact spots in order not to leave any untreated areas between impacts. The surface is treated by making a scan by rows of spaced-apart spots and by repeating the scan several times with a slight shift in the rows of spots in order to reach all points on the surface.

This also entails renewing the coating each time. As a result, in order to treat a given surface, the coating has to be renewed up to twelve times (see for example the process described in EP 0 794 264). The implementation of this technique is lengthy and complex and, as a consequence, costly. It is therefore preferred to limit the extent of the zones to be treated.

In the case of a blade, the above treatment is applied in zones located in the zones lying on the periphery of the blade, such as the leading edge or the trailing edge. These edges are the most exposed to damage caused by the impact of highly erosive particles or of foreign bodies that may cause local deformation, tearing or cracks. However, other parts of the blade are not free of damage. For example, it has been found that there are scratched zones on the pressure face.

For the abovementioned reasons, it would not be economically advantageous to treat an extensive area of the blade by laser shock peening.

The objective of the invention is therefore to provide a component, in particular a blade, in which all the surface parts liable to be damaged to a greater or lesser extent, especially damaged by foreign bodies and erosive agents, are treated by putting surface sublayers in compression, but the cost of which remains acceptable.

Moreover, it has been found that zones treated by peening as intense as laser shock peening result in local tensile stresses on their periphery, which balance out all the stresses. It would therefore be desirable to reduce the effects of these tensile stresses by preventing large tensile gradients and by ensuring that the zones in tension are away from the sensitive zones.

SUMMARY OF THE INVENTION

These objectives are achieved in accordance with the invention with a metal component comprising at least a first zone treated by putting subjacent layers in compression, wherein said zone comprises at least a first layer put in compression by shot peening and a second layer, subjacent the first layer, which is put in compression by laser shock peening.

Putting the second layer in compression may also have the effect of increasing the residual compressive stresses in the first layer—if these stresses are obtained by conventional shot peening, and are around 300 to 500 MPa. In the case of prior ultrasonic shot peening, these stresses are around 700 to 800 MPa, but the laser shock peening causes little or no increase.

In the case of a turbomachine blade, said zone advantageously extends along the leading edge, the trailing edge and/or the tip of the blade. The blades concerned are in particular solid compressor blades such as the fan blades in fan jet engines. The invention however is not limited to turbomachine blades—it applies also to rotors, especially to rotor disks and more particularly to blisks.

The solution of the invention results from the observation that the compression treatment by shot peening, particularly ultrasonic shot peening, can provide residual stress levels comparable to those obtained by laser shock peening, although they are created only over a shallower depth. By combining the less expensive shot peening compression treatment with laser shock peening compression treatment, a product that is generally more economic from the standpoint of its manufacture is obtained.

Preferably, the component has a second zone, different than said first zone, which is put in compression by only shot peening. More particularly the shot peening is ultrasonic shot peening.

The invention also relates to a method of treating a metal component, comprising a first treatment step in which said first zone is treated by shot peening, followed by a second treatment step in which this same zone is treated by laser shock peening.

In particular, in a first step, said first zone and a second zone different than the first are treated by shot peening, and then, in a second step, only the first zone is treated by laser shock peening.

Preferably, the two zones are adjacent, thus creating a progressive residual stress gradient. Unlike in components comprising zones treated by laser shock peening bordered by adjacent zones not in compression, no adjacent portions are created which are subjected to a sudden jump in stress in which cracks may appear. Moreover, any deformation in components such as thin blades generated by these sudden changes in stress is avoided.

The reduction in overlap of the laser impacts also has an advantage as regards the deformation generated by the laser shock treatment. This is because it has been found that the level of distortion in for example a compressor blade is higher the larger the amount of overlap of the impact. This has for example been reported in patent U.S. Pat. No. 5,531,570. The reduction in the amount of overlap favored by the invention is therefore also beneficial from this standpoint.

The present application also relates to a turbomachine rotor disk, in particular a blisk, comprising blades according to the invention. It also relates to a turbomachine comprising blades according to the invention in particular to a turbojet provided with compressor blades according to the invention.

BRIEF DESCRIPTION OF THE DRAWINGS

Other features and advantages are mentioned in the following description of a nonlimiting embodiment of the invention, together with the appended drawings consisting of the following figures:

FIG. 1 is a schematic representation of a turbomachine blade;

FIG. 2 is a sectional view on the direction A-A of the blade of FIG. 1, showing the surface treated by shot peening;

FIG. 3 is a view of a blade showing zones treated by shot peening and by laser shock peening according to the invention;

FIG. 4 is a sectional view along the direction BB of the blade of FIG. 3, showing the layers subjacent the surface put in compression by shot peening and laser shock peening according to the invention;

FIG. 5 is an illustration of the laser shock compression treatment; and

FIG. 6 shows a scanning sequence of laser beam impacts during the treatment.

DESCRIPTION OF THE PREFERRED EMBODIMENTS

As may be seen in FIG. 1, a blade 1 comprises a root 3, a platform 5 and an airfoil 7. The blade is mounted via the root 3 on the periphery of a rotor disk in a suitable housing. The platform provides the continuity of the annular duct in which the gas stream is guided.

The airfoil 7 of aerodynamic shape is swept by the gas stream. It is this part of the blade that is exposed to the external stresses, which have an effect on the lifetime. The leading edge LE and trailing edge TE are possibly exposed to violent shocks, such as from foreign bodies ingested by the motor and striking the fan blades. These impacts may have a depthwise effect in the peripheral zones of the airfoil. Other impacts, such as those of erosive particles, are more superficial, but are found in more extended zones of the airfoil in the form of scratches and abrasions. The residual stresses generated by the peening help to limit damage and crack propagation and to increase the fatigue resistance—their purpose is to maintain the lifetime of the component.

According to the invention, the component is firstly treated by shot peening, over an extended surface corresponding at least partly, but preferably, to all of the zones liable to be damaged. This treatment is advantageously an ultrasonic shot peening treatment. The zone treated by this technique is shown schematically at 71. It extends over the pressure face of the airfoil between the leading edge LE and the trailing edge TE. This zone extends partially over the suction face of the airfoil downstream of the leading edge LE. The thickness of the layer in compression below the surface is about 0.3 mm, and more generally around 0.2 mm. The residual stress level reached at this depth is around 400 to 500 MPa.

In order to achieve this result, an example of US shot peening treatment on a TA6V titanium alloy is described below. 100C6 steel shot 1.5 mm in diameter was made to undergo a movement with an amplitude of 85 microns by a sonotrode vibrating at ultrasonic frequency. The intended degree of overlap was 40% and the treatment time was 52 s. The compressive stresses obtained reached up to 700 MPa and extended over a depth of 250 to 300 microns.

The laser shock treatment was then carried out in the zones that are most highly stressed, namely in particular the LE and TE, but also possibly the tip. Here, this zone 73 was limited to the region of the leading edge LE over a specified distance downstream.

The principle of this technique will be recalled below in relation to FIG. 5.

The component 100 to be treated is coated with what is called an ablative layer 102, and the pulsed laser beam 106 is applied to the component through a confinement layer 104.

The various steps of the method are the following:
1) preparation of the ablative layer 102, by application of a paint or of an adhesive tape; optionally, the ablation may take place directly on the metal surface;
2) positioning of the confinement layer 104, which is for example a curtain of flowing water or a glass plate;
3) laser firings 106, the impact spots of which are in the form of a disk, which has a round, elliptical or other shape, with an area of the order of 10 mm$^2$. The impact spots are close to one another, but without any overlap so as always to correspond to a virgin zone of the ablative layer. The component and the laser focusing head undergo a relative displacement;
4) removal of those parts of the ablative layer that are not vaporized; cleaning of the surface; and
5) application of a fresh ablative layer; and
6) repetition of the cycle from point 2).

The ablative layer is vaporized (108) by the laser beam and confined by the confinement layer. This results in the formation of a shockwave 110, which propagates into the metallic material, thus putting it in compression.

These operations form a sequence which has to be repeated 10 to 12 times in the laser shock peening method of the prior art in order to cover the surface in question with the desired number of impact overlaps.

According to the invention, the number of operations is reduced by laser shock peening a zone treated beforehand by shot peening especially US shot peening. This prior shot peening is carried out in such a way that the residual compressive stresses are around 500 to 700 MPa at a depth of 0.2-0.3 mm below the surface of the component.

FIG. 6 shows an example of the distribution of the impact spots on the component. The first impact spots I1 are touching disks. The second row of impact spots I2 also consists of touching disks, but offset by one radius both transversely and longitudinally with respect to the run direction RD.

The treatment of the invention requires fewer laser impacts, since the treated zones already include a layer having residual compressive stresses of the same level as those produced by the laser shock peening. Since the compressive stress level between two neighboring impact spots is not zero, it is unnecessary for there to be perfect overlap thereof. This results in a fewer number of passes and also a fewer number of times that the coating has to be renewed. The treatment time may be reduced by 40 to 50%.

Where appropriate, the compression treatment is followed by a polishing operation, by tribofinishing or by abrasion, especially by means of an abrasive tape or an abrasive paste. It should be noted in this case that it is unnecessary to apply a coating, the ablation being carried out directly on the metal surface.

The treatment applies to new components, but it is also suitable for blades repaired by material surfacing.

The invention claimed is:

1. A method of treating a metal component comprising at least a first zone treated by putting layers beneath the surface thereof in compression, wherein said first zone comprises at least a first layer put in compression by shot peening and a deeper subjacent second layer put in compression by laser shock peening, said method comprising a first treatment step of treating said first zone by shot peening, followed by a second treatment step of treating said first zone by laser shock peening, wherein said second treatment step comprises performing a first scan of the first zone with a laser beam thereby forming a plurality of first laser impact spots on the first zone such that the first zone is subject to both shot peening and laser shock peening, and wherein said first laser impact spots do not overlap each other.

2. the method as claimed in claim 1, wherein said second treatment step further comprises performing a second scan of the first zone with the laser beam thereby forming a plurality of second laser impact spots on the first zone, wherein said second laser impact spots do not overlap each other but overlap said first laser impact zones.

3. The method as claimed in claim 1, wherein said first and second treatment steps are performed so to produce a same level of residual compressive stresses in said first and second layers.

4. The method as claimed in claim 1, wherein the shot peening is an ultrasonic peening.

5. The method as claimed in claim 1, wherein both said first zone and a second zone different than the first are treated by shot peening, and then only the first zone is treated by laser shock peening.

6. The method as claimed in claim 5, wherein said first and second zones are adjacent.

7. The method as claimed in claim 1, wherein the first layer has a thickness of 0.2 to 0.3 mm.

8. The method as claimed in claim 7, wherein the residual stresses of the first layer are between 500 and 700 MPa.

* * * * *